(No Model.)
H. R. UNDERHILL.
AXLE BOX.
No. 343,350. Patented June 8, 1886.
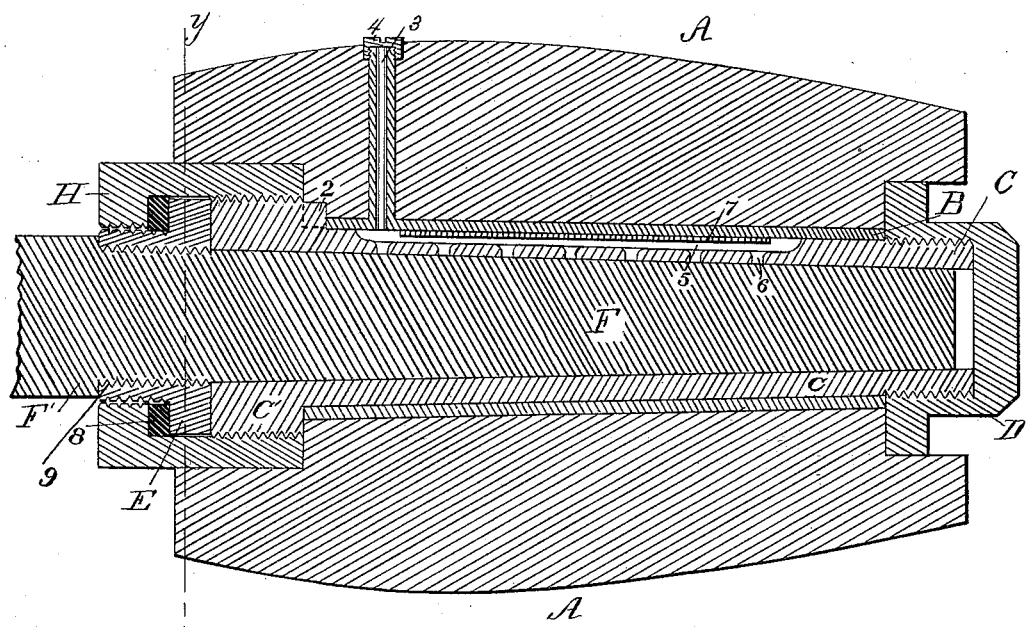
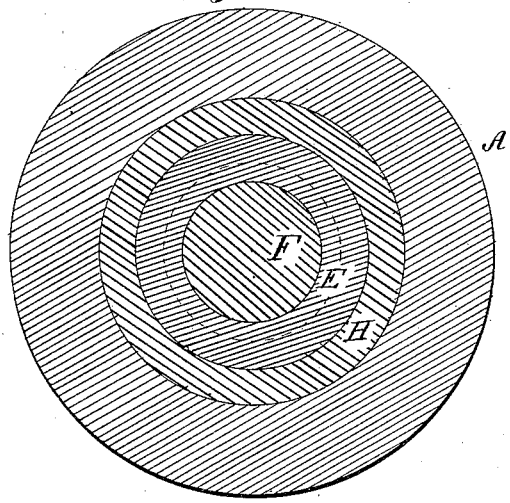
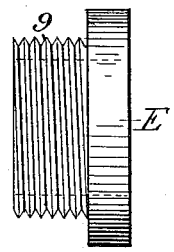
Attest:
W. D. Harrington
H. G. Blaw
Inventor,
Hazen R. Underhill.
By A. Bell,
Attorney.

UNITED STATES PATENT OFFICE.

HAZEN R. UNDERHILL, OF DERRY, NEW HAMPSHIRE.

AXLE-BOX.

SPECIFICATION forming part of Letters Patent No. 343,350, dated June 8, 1886.

Application filed April 10, 1886. Serial No. 198,418. (No model.)

*To all whom it may concern:*

Be it known that I, HAZEN R. UNDERHILL, a citizen of the United States, residing at Derry, in the county of Rockingham and State of New Hampshire, have invented certain new and useful Improvements in Axle-Boxes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide, through my improved axle-box, simple and effective means for retaining it on the axle-spindle, preventing the admission of dirt thereto, and for furnishing the necessary lubrication to the axle-spindle. I accomplish this object by lining the central opening of a hub with a metal bushing, fitting therein an axle-box having an externally-threaded shoulder on the inner end, and a thread cut on the outer end, a movable collar engaging with the threaded shoulder, and a cap screwed on the outer end of the box. A permanent collar, screwed upon the inner end of the axle-spindle, retains the wheel in place when the movable collar is screwed upon the shoulder of the axle-box. The lubrication of the spindle is provided for by a supply-tube running through the hub and the bushing therein and communicating with a longitudinal groove formed in the side of the axle-box. This groove has a series of perforations along its bottom, and may be filled with cotton-waste to take up and slowly feed to the spindle the oil supplied thereto.

Figure 1 represents a longitudinal vertical section drawn on line *x x* of Fig. 2, showing hub, bushing therein, movable and permanent collars, and the oil-groove and supply-tube. Fig. 2 represents a cross-section drawn on line *y y* of Fig. 1. Fig. 3 represents the permanent collar, which is screwed upon the inner end of the axle-spindle, showing the external thread cut upon its outer surface.

In the drawings like letters and figures indicate like parts.

A is the hub, and B the metal bushing, which lines its central opening. This bushing extends along the entire length of said opening, terminating at the bottom of the annular recess cut in the outer and inner ends of the hub. The bushing may be kept securely in place by expanding its ends or in any other approved manner.

C is the axle-box, and C' the shoulder-piece, having threads cut upon its exterior surface. The outer end of the axle-box has threads cut upon its exterior, which engage with the internal threads of the cap-nut D. When this cap is screwed upon the end of the box, it effectually shuts out dust or dirt from the outer opening of the axle-box and holds said box securely in the hub. Any tendency of the box or its bushing to turn within the hub is prevented by the shoulder, lug, or projection 2, which fits into a recess or notch cut in the end of the hub and bushing, said lug being held firmly in the notch by the action of the cap-nut D on the outer end of the axle-box C.

E is the permanent collar, screwed upon the inner end of the spindle F, next to the shoulder of the axle-bar F'. This collar abuts against the end of the axle-box shoulder C', so that when the movable collar H is screwed on said shoulder the axle-spindle, by means of this permanent collar E, is held securely in the box. The annular shank 9 of the permanent collar E has a thread on its exterior, cut away from the forward movement of the wheel, as shown in Fig. 3. The function of this thread is to throw outwardly, as the wheel revolves, particles of dirt which may enter at this point. This tendency to clear itself from dirt may be increased by a similar thread cut on the movable collar on the sides of the opening through which the annular shank 9 passes. It should be understood that these threads on the shank and the movable collar do not engage with each other. They are brought into close proximity, but do not come into contact, the object being to have as close a joint or connection as possible without creating friction. As the movable collar rotates with the axle-box to which it is screwed and the permanent collar remains stationary on the axle-spindle, the necessity of preventing the contact of the parts is evident.

8 is a noiseless washer, which may be placed upon the permanent collar, if found necessary, to prevent the lateral movement of the spindle within the box after the movable collar H has been screwed on the shoulder of the box.

3 is the supply-tube, passing through the hub and its bushing and communicating with the longitudinal groove 5, formed on one side of the axle-box C. Along the bottom of this groove are several holes, 6, passing through the shell of the axle-box. Cotton-waste may be laid in this groove and held therein by a thin strip of metal, 7, so as to prevent its displacement when the axle-box is inserted into the bushing. Oil is supplied through tube 3, saturating the cotton-waste in groove 5, thus providing for its slow deposit on the axle-spindle through perforations 6.

4 is the tube-cap.

The movable collar H should be first placed upon the axle-spindle. The permanent collar E is then screwed into position at the base of the spindle, the spindle inserted into the axle-box, the movable collar screwed upon the shoulder of said box, the cap D screwed upon the outer end of the box, and the wheel is in position for use.

What I claim as new and of my invention is—

1. The combination, with a wheel-hub having a central opening, of a metal bushing lining said opening, an axle-box having a threaded shoulder on its inner end, and a thread cut on the exterior of its outer end and fitted to and secured within said bushing, an axle-spindle carrying a permanent collar screwed upon the base of said spindle, the annular shank or neck of said collar having an exterior thread cut thereon, as shown and described, and a movable collar loosely fitting over said annular shank and engaging with the threaded shoulder of the axle-box, substantially as and for the purpose set forth.

2. The combination, with a wheel-hub having a metal bushing lining its central opening, of an axle-box having a shoulder on its inner end provided with an external thread, and an external thread upon its outer end, a cap screwing upon said outer end, and a movable collar screwing upon the threaded shoulder of its inner end, and an axle-spindle carrying a permanent collar screwed upon said spindle near the shoulder of the axle-bar, the annular shank of said collar provided with a thread working outwardly, as shown and described, on its exterior surface and extending through the movable collar loosely fitted thereon, substantially as set forth.

3. The combination, with a hub having an oil-supply tube, of an axle-box, C, constructed as shown and described, and provided on its exterior surface with longitudinal groove 5, having perforations 6 therein and communicating with said supply-tube, cap D, movable collar H, and axle-spindle F, carrying permanent collar E, having outwardly-working threads on the annular shank thereof, substantially as set forth.

In testimony whereof I affix my signature in presence of two witnesses.

HAZEN R. UNDERHILL.

Witnesses:
GREENLEAF C. BARTLETT,
CHARLES BARTLETT.